(12) United States Patent
Cavusoglu Ataman et al.

(10) Patent No.: US 12,478,552 B2
(45) Date of Patent: Nov. 25, 2025

(54) CLOSURE SYSTEM AND KIT

(71) Applicants: HOFFMANN-LA ROCHE INC., Little Falls, NJ (US); GENENTECH, INC., South San Francisco, CA (US)

(72) Inventors: Nariye Salibryam Cavusoglu Ataman, Basel (CH); Monica De Bardi, Basel (CH); Guido Drees, Basel (CH); Maria Enterrios Quintana, Basel (CH); Joseph Alexander Martin, Basel (CH); Holger Roehl, Basel (CH); Thomas Peter Stuedeli, Basel (CH); Eszter Voros, Basel (CH); Neil Bentley Cammish, Basel (CH); Marcel Sigrist, Basel (CH); Shreya Munjal, South San Francisco, CA (US); Matthieu Noël Claude Giletti, Basel (CH)

(73) Assignees: HOFFMANN-LA ROCHE INC., Little Falls, NJ (US); GENENTECH, INC., South San Francisco, CA (US)

( * ) Notice: Subject to any disclaimer, the term of this patent is extended or adjusted under 35 U.S.C. 154(b) by 97 days.

(21) Appl. No.: 18/257,787

(22) PCT Filed: Dec. 17, 2021

(86) PCT No.: PCT/EP2021/086612
§ 371 (c)(1),
(2) Date: Jun. 15, 2023

(87) PCT Pub. No.: WO2022/129586
PCT Pub. Date: Jun. 23, 2022

(65) Prior Publication Data
US 2024/0050314 A1 Feb. 15, 2024

(30) Foreign Application Priority Data
Dec. 17, 2020 (EP) .................................... 20215183

(51) Int. Cl.
*A61J 1/14* (2023.01)
*B65D 51/00* (2006.01)

(52) U.S. Cl.
CPC .......... *A61J 1/1425* (2015.05); *B65D 51/002* (2013.01)

(58) Field of Classification Search
CPC ............................. A61J 1/1425; B65D 51/002
(Continued)

(56) References Cited

U.S. PATENT DOCUMENTS 891,696 A * 6/1908 Hubert .................. B65D 41/28
215/277
1,834,548 A * 12/1931 Noble .................... B65D 39/12
215/272
(Continued)

FOREIGN PATENT DOCUMENTS

EP 2908396 A1 5/2008
FR 2908396 A1 5/2008
(Continued)

OTHER PUBLICATIONS

Hooke's Law: The Physics of Coiled Springs. Monroe Engineering, 2025. https://monroeengineering.com/blog/hookes-law-the-physics-of-coiled-springs/ (Year: 2025).*
Written Opinion and International Search Report issued Feb. 28, 2022 in Intl Appl. No. PCT/EP2021/086612.
(Continued)

*Primary Examiner* — James N Smalley
(74) *Attorney, Agent, or Firm* — MEDLER FERRO WOODHOUSE & MILLS PLLC (57) ABSTRACT

A closure system is disclosed for closing a container opening. The closure system includes a stopper member, a cage member for mounting to the container, and a spring member. The stopper member has a plug portion that tightly fits into the container opening and a cover portion that abuts a boundary surface adjacent to the container opening con- (Continued)

tainer. The stopper member plug portion is fitted into the container opening, the stopper member cover portion abuts the boundary surface of the container, and the cage member is mounted to the container to hold the stopper member, when the closure system is in an assembled state. The cage and spring members are arranged to position the spring member between the stopper member cover portion and the cage member such that the spring member pushes the cage member away from the cover portion when the closure system is in the assembled state.

17 Claims, 6 Drawing Sheets

(58) Field of Classification Search
USPC .................................................. 215/247, 249
See application file for complete search history.

(56) References Cited

U.S. PATENT DOCUMENTS

| 4,243,150 | A | 1/1981 | Gunne et al. |
| 11,850,210 | B2 * | 12/2023 | Dadachanji ............. B65B 7/161 |
| 2011/0000872 | A1 | 1/2011 | Aneas |

FOREIGN PATENT DOCUMENTS

| FR | 2927316 | A1 | 8/2009 |
| JP | 2011511741 | A | 4/2011 |
| WO | 2012/152796 | A1 | 11/2012 |
| WO | 2015/193830 | | 12/2015 |

OTHER PUBLICATIONS

Notice of Reasons for Rejection issued Sep. 2, 2025 in JP Appl. No. 2023-536365.

* cited by examiner

CLOSURE SYSTEM AND KIT

TECHNICAL FIELD

The present invention relates to a closure system according to the preamble of independent claim 1 and more particularly to a kit having a container and such a closure system.

Such closure systems comprise a stopper member made of an elastic material and having a plug portion configured to tightly fit into the opening of the container and a cover portion configured to abut a boundary surface adjacent to the opening of the container, and a cage member configured to be mounted to the container. The closure system is configured to be in an assembled state in which the plug portion of the stopper member is fitted into the opening of the container and the cage member is mounted to the container to hold the stopper member. Closure system of this type can be used for tightly and securely closing the opening of the container, in particular, with respect to liquids and gases.

BACKGROUND ART

In many chemical or pharmaceutical applications, liquid substances such as drug substances, chemical substances, substances of clinical trials or others are provided in specific containers such as vials, cartridges or the like. These containers typically have a hollow interior and an opening through which the interior is accessible. The opening typically is surrounded or limited by a boundary surface. The substances are filled into the interior of the containers and the openings are subsequently tightly closed.

For closing the containers, it is known to use elastomeric stoppers. Such stoppers may provide for tightly or even hermetically sealing the openings and additionally to allow retrieval of the substances out of the containers by piercing the stoppers with needles and introducing the needles into the substances.

Typically, stoppers have a plug portion and a cover portion, wherein the plug portion is dimensioned to tightly fit into the opening and the cover portion is shaped to abut the boundary surface of the opening. More specifically, the stoppers are pressed into the opening such that the cover portions are compressed to a certain extent to generate tightness. As required in many applications, stoppers and containers of the kind allow for an efficient aseptic filling and closing of the containers. Further, on an industrial scale, containers, such as particularly vials, and stoppers are often dimensioned in predefined sizes. Like this, automated processing with standard equipment can be efficiently implemented.

To achieve a sufficient tightness of the container after filling and closing, the stoppers have to be pressed into and/or onto surfaces of the containers. To hold the stoppers in such compressed state typically caps or cages are used which are arranged on and around the stoppers and openings. For example, it is known to arrange a rigid plastic cap around the head of a vial being closed with a stopper. Thereby, the head and at least part of the neck portion of the vial typically is completely covered by the plastic cap which holds the stopper in the pressed state. Or, it is known to crimp a partially formed metal cap about the head of the container and the cover portion of the stopper to fix and press the stopper to the container (crimp caps).

However, even though such capping systems allow for providing pushing the stoppers, typically it is difficult to accurately define the pressure applied to the stopper. And since the involved components such as vials, stoppers and the like usually involve manufacturing tolerances, automatic assembling of the closure system may result in differently or varyingly pressurizing the stoppers. Thereby, a too low pressure may impair long-term tightness of the closure. Further, a too high pressure may damage the stopper which again will decrease tightness.

Therefore, there is a need for a device or system that allows for the tight closure of an opening of a container with a pressurized stopper, wherein predefined pressure applied to the stopper can efficiently be assured.

DISCLOSURE OF THE INVENTION

According to the invention this need is settled by a closure system as it is defined by the features of independent claim 1, and by a kit as it is defined by the features of independent claim 16. Preferred embodiments are subject of the dependent claims.

In one aspect, the invention is a closure system for closing an opening of a container. The container can be a container used in pharmaceutical or chemical research, development or production such as a cartridge. It can particularly be a vial.

The term "vial" as used herein can relate to vials in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene, a cyclic olefin copolymer or a cyclic olefin polymer.

The closure system comprises a stopper member, a cage member and a spring member. The term "member" in this connection and in the context of the following description can relate to a single piece unit. Such single piece unit can be embodied by fixing plural pieces or parts, e.g. made of different materials, together, to a monolithic element made of a single material, or a monolithic element made of one or more materials that are chemically or physically bonded in the manufacturing process such as molding an opaque polymer over a transparent substrate or vice versa.

The stopper member is made of an elastic material. It has a plug portion configured to fit, particularly to tightly fit, into the opening of the container and a cover portion configured to abut a boundary surface adjacent to the opening of the container.

The term "elastic" in connection with the stopper member can relate to properties of the material the stopper member is made of. More specifically, such material properties can be elasto-plastic and, in particular, compressible. Advantageously, the material of the stopper member allows it to be sterilized and to maintain aseptic conditions. The stopper member can be embodied as one piece, i.e. as a monolithic element. The plug portion can be essentially cylindrical such that it matches the geometry of the opening. To allow the cover portion to abut the boundary surface, the cover portion typically laterally or radially projects over the plug portion. It can be more or less disc shaped.

The cage member is configured to be mounted to the container. The closure system is configured to be in an assembled state in which the plug portion of the stopper member is fitted into the opening of the container and the cage member is mounted to the container to hold the stopper member.

The cage member and the spring member are configured to position the spring member between the cover portion of the stopper member and the cage member such that the spring member is arranged to push the cage member away from the cover portion of the stopper member, when the closure system is in the assembled state.

The cage member and the spring member can be configured to position the spring member between the cover portion of the stopper member and the cage member by generating a free space when being in the assembled state. In particular, this free space can be designed to locate the spring member in it and, advantageously, in a predefined alignment such that the spring member acts as intended.

The term "arranged to push the cage member away from the cover portion" in this connection relates to a configuration of the spring member to apply a spring force to the cage member directed away from the cover portion, when the cage member contacts the spring member. Thereby, in particular in the detached position, the cage member can be distant from the spring member such that it does not apply any spring force to the cage member. However, in the fixed position the spring member contacts the cage member and applies the spring force such that the spring member is arranged to push the cage member. More specifically, in the detached position the cage member can be distant to or only touching the spring member and, when moving the cage member relative to the stopper member, the spring member directly or indirectly contacts the cage member and applies its spring force to the cage member, thereby pushing it away from the stopper member. In this state, the spring member applies or transmits a pushing force between the cage member and the cover portion of the stopper member.

By the spring member being arranged to apply a pressure or force to the cover portion of the stopper member in order to push the cover portion of the stopper member onto the boundary surface of the opening of the container, the spring member allows for providing an essentially constant predefined pressure or force onto the stopper member such that irrespective of the precise dimension of the cage member, the stopper member and/or the container, the force by which the cover portion of the stopper member is pressed to the edge of the opening of the container can be accurately set or defined. Such configuration allows for efficiently compensating tolerance variations of the involved components and, at the same time, ensuring tight closure of the container. The force applied to the cover portion of the stopper member can be in a range from about 10 Newton (N) to about to about 100 N depending on the material characteristics and geometry of the stopper member and other components. For example, it can be about 15 N. Like this, the stopper member can be compressed between the stopper push section of the cage member and the boundary surface of the container such that an appropriate tightness between stopper member and container can be achieved and maintained.

Preferably, the cage member has a locking structure configured to engage a corresponding structure of the container, a lid section and in intermediate section between the lid section and the locking structure. When the locking structure engages the corresponding structure, the cage member typically is locked or fixed to the vial. In contrast, when the locking structure disengages the corresponding structure, the cage member typically is not fixed to the vial such that it can be removed from the vial.

The corresponding structure of the container can be a groove or a similar indentation provided at an outer surface of the container. For example, in case the container has a body, a neck and a head with the opening of the container, the groove can be provided at a circumference of the head. Also, the corresponding structure can be an outer shape of the container such as a transition from the head to the neck.

Engaging the corresponding structure can, e.g., be implemented by clipping the corresponding structure. The term "clip" as used herein relates to snapping into or behind the corresponding structure, or a similar mechanism. Generally, such clipping typically involves an elastic deformation or dislocation of one element, such as the cage member, when moving two elements, such as the cage member and the container, together and then elastically deforming the one element back behind a structure of the second element once the two elements are properly positioned. More specifically, for allowing such clipping the clipping element of the cage member can be elastically deformed or bent relative to the other portions of the cage member.

The locking structure allows for providing a snap-fit connection between the cage member and the container. Once clipped or snap-fitted to the container, the cage element may be in a form fit connection with the container. Advantageously, when being clipped to the container or when engaging the corresponding structure of the container, the cage element cannot be removed from the container without being destroyed or broken.

Advantageously, the locking structure of the cage member is configured, in the assembled state of the closure system, to be in a detached position in which the locking structure of the cage member is disengaged from the container, and in a fixed position in which the locking structure engages a corresponding structure of the container. By being capable of assuming the detached and fixed positions, the cage member can efficiently and conveniently be processed, particularly also in an automated manner. For example, the cage member can be mounted to the vial first. In the detached position where it is possible to manipulate the closures system to compress the stopper member. Then, when accurately closing the vial, the locking structure can be changed into the final fixed position.

The locking structure of the cage member preferably comprises at least one positive form lock element configured to be deformed to engage the corresponding structure of the container. Such positive form lock element allows for efficiently and safely securing or locking the cage member to the container. In particular, the at least one positive form lock element may be elastically movable in a radial or outward direction.

Thereby, the at least one positive form lock element of the locking structure of the cage member preferably comprises a tongue portion. The tongue portion can be configured to be radially or centrally moved from the detached position to the fixed position. Such tongue portion allows for providing an efficient and safe locking or fixing of the cage member to the container by engaging the corresponding structure of the container. In particular, a rigidity and elasticity of the locking structure can be suitably configured by means of such a tongue portion.

The tongue portion of the at least one positive form lock element of the locking structure of the cage member preferably extends from the cylindrical intermediate section of the cage member. Such configuration allows for efficiently implementing the locking structure.

The tongue portion of the at least one positive form lock element of the locking structure of the cage member preferably is elastically movable relative to the intermediate section of the cage member. In particular, the positive form lock element can be elastically movable by being at least partially deformed in an elastic manner, i.e., tending to move back to the original shape and/or position. The positive form lock element may allow for some normal relaxation due to material properties.

Advantageously, in order to allow a uniform locking or fixing, the locking structure comprises plural positive form lock elements with or without tongue portions. The number of positive form lock elements or tongue portions can be in a range of about four to twelve, of about four to eight or of about six. Thereby, each of the positive form lock elements or tongue portions can be elastically movable relative to the intermediate section of the cage member. In particular, the cage member can be configured such that, when being fixed to the container, the intermediate section is essentially not deformed but the positive form lock elements or tongue portions are elastically moved. The elastic movability of the positive form lock elements or tongue portions, e.g., can be provided by the positive form lock elements or tongue portions outwardly bending and/or by the positive form lock elements or tongue portions being tilted about a joint portion.

Preferably, the cage member is made of a shape-retentive material. The term "shape retentive" as used in this context relates to a material or structure being capable of maintaining its form when no force is applied. In particular, the shape-retentive material can be dimensionally stable. Typically, shape-retentive materials are comparably rigid. Particularly, the material of the cage member can be more rigid than the material of the stopper member. Also, the shape-retentive material advantageously is sufficiently elastic to allow deformation as described below. Such shape-retentive material can be a plastic or a metal such as, in particular, a steel or stainless steel.

Preferably, the spring member has essentially linear spring characteristics such that it advantageously obeys Hooke's law. The spring characteristics can be essentially linear in this connection when they are linear in a range of compression of the spring member which may be involved in the closure system. By having linear spring characteristics, the spring member has a constant or uniform spring rate more or less independent from its compression. This allows for ensuring a predefined and relatively low range of force to be applied to the stopper that is far less dependent on tolerance variation and the relatively high rate of compression of the stopper (that results in a relative high range of forces).

The intermediate section of the cage member preferably is configured to surround the spring member and at least a portion of the cover portion of the stopper member and/or a head portion of the container, when the closure system in the assembled state. In case the container is a vial or a similar container, the intermediate section can be configured to surround a head of the vial which at least partly comprises the opening and the boundary surface. Thus, the intermediate section of the cage member preferably is configured to surround a head portion of the container. This allows for efficiently holding the stopper in or on the vial and for efficiently mounting the cage member to the container.

The intermediate section of the cage member preferably is essentially cylindrical. Like this, the intermediate section can efficiently be designed to surround the head portion of the container or for other reasons such as asymmetry of interfacing connecting systems such as vial transfer devices. In particular, the intermediate section can have the shape of a small cylinder or ring. The term "small" in connection with the cylinder may relate to a cylinder having a height or axial length which is smaller than a diameter. The cylinder can particularly have a circular cross section.

Preferably, the lid section of the cage member comprises an aperture such that the cover portion of the stopper member is accessible through the aperture of the lid section when the closure system is in the assembled state. The aperture of the cage member can particularly be located adjacent to a surface of the cover portion of the stopper member being in correspondence with the opening of the container when the closure system is in the assembled state. Thereby, the aperture can be aside the section of lid section abutting the surface of the cover section of the stopper member being opposite to the surface contacting the boundary surface of the container. Like this, the accessible portion of the stopper member can be easily accessed and cleaned, e.g., by alcohol swabbing. For example, the aperture of the stopper push section can be a circular central aperture of the stopper push section being a flat ring.

Thereby, the closure system preferably comprises a cover member reversibly mountable to the lid section of the cage member to close the aperture of the lid section of the cage member. Such cover member allows for protecting the cage member. It can be configured to cover the aperture of the cage member when being mounted to the cage member. The cage member can be provided with the aperture to access the cover portion of the stopper member when the closure system is in the assembled state.

Preferably, the cover portion of the stopper member has an edge section with a front face configured to abut the boundary surface of the opening of the container and a back face opposite to and corresponding to the front face of the edge section, wherein the spring member is configured to abut the back face of the edge section of the stopper member when the closure system is in the assembled state. Particularly, the spring member can be configured to abut the essentially complete back face of the edge section of the stopper member. Such complete abutting allows for an efficient and homogenous compression of the stopper member.

Preferably, the cage member is configured to end essentially adjacent to the locking structure when the closure system is in the assembled state. When the container is equipped with a head portion having the boundary surface adjacent to the opening passing over into a neck portion, the cage member can be configured essentially not to extend over the neck portion of the container or to end at the neck portion of the container. Like this, it can be achieved that the neck is kept free which allows an efficient handling of the closed container and attachment to standard or legacy accessories such as transfer kits, and an appropriate optical inspection of the complete interior of the container including the neck.

Preferably, the spring member has an abutting section and at least one elastic lamella, wherein the abutting section is configured, in the assembled state, to abut the cover portion of the stopper member and the at least one lamella to extend from the abutting section to the cage member. In particular, the at least one lamella can extend from the abutting section towards the lid section of the cage member.

Providing the spring member with the abutting section allows for efficiently abutting the stopper at a predefined portion thereof. Thereby, the abutting section can be essentially disk shaped which allows for uniformly and planarly providing the spring pressure to the stopper member.

The abutting section of the spring member can be equipped with an opening. In particular, the opening can be embodied in correspondence with the aperture of the lid section of the cage member such that, in the assembled state, the stopper member can be accessed through the cage member and the spring member.

Preferably, the at least one elastic lamella comprises a plurality of lamellas to allow a more or less spring force distribution towards the stopper member. Furthermore, the lamella(s) can be designed to be bent or collapse when being pushed by the cage member such that, e.g. due the elasticity of the material of the spring member, pushes abutting section away from the cage member towards the stopper member.

Another aspect of the invention is a kit comprising a container and a closure system as described above. The container comprises an opening for accessing an interior of the container and a boundary surface adjacent to the opening.

By means of the kit according to the invention the effects and benefits described above in connection with the closure system according to the invention and its preferred embodiments can efficiently be achieved.

BRIEF DESCRIPTION OF THE DRAWINGS

The closure system and kit according to the invention are described in more detail hereinbelow by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented, and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
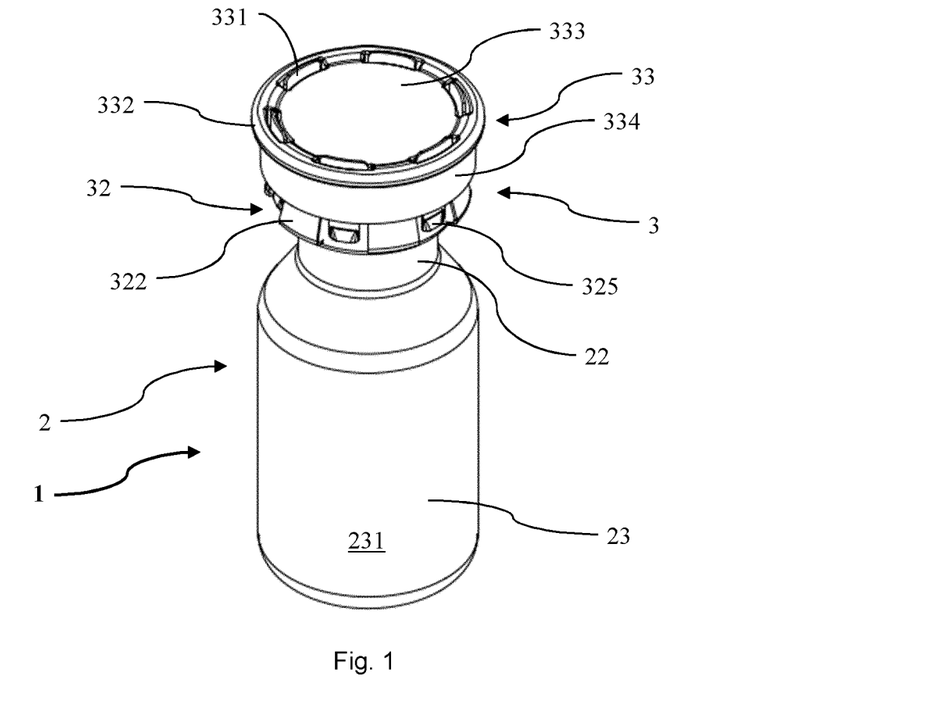
FIG. 1 shows a perspective view of an embodiment of a kit according to the invention comprising an embodiment of a closure system according to the invention, wherein the closure system is in an assembled state and its cage member is in a detached position.

FIG. 1 shows a first embodiment of a kit 1 according to the invention comprising a glass or plastic vial 2 as container and a first embodiment of a closure system 3 according to the invention. In FIG. 1 the kit 1 and closure system 3 are depicted in an assembled state where the closure system 3 is mounted to the vial 2. The closure system 3 is in a detached position.

The vial 2 has a body 23 with a hollow interior 231 and a neck 22 passing over into a head 21 (not visible in FIG. 1) as head portion. The closure system 3 is mounted to the head 21 of the vial 2 such that the head 21 is covered. The closure system 3 comprises a metal cage 32 as cage member and a lid-like cover 33 as cover member.

Figure 2:
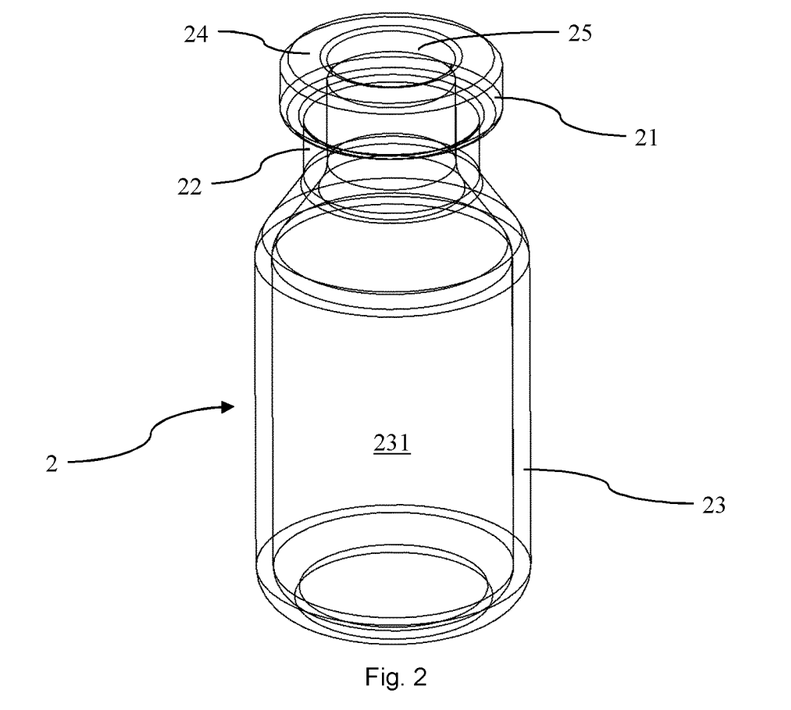
FIG. 2 shows a perspective view of a vial as an embodiment of a container of the kit of FIG. 1.

Further, as best visible in FIG. 2, the vial 2 has a circular or cylindrical opening 25 at its head 21 which allows to access the interior 231 of the body 23. A boundary surface 24 adjacent to the opening 25 is designed as a flat upwardly oriented surface.

Figure 3:
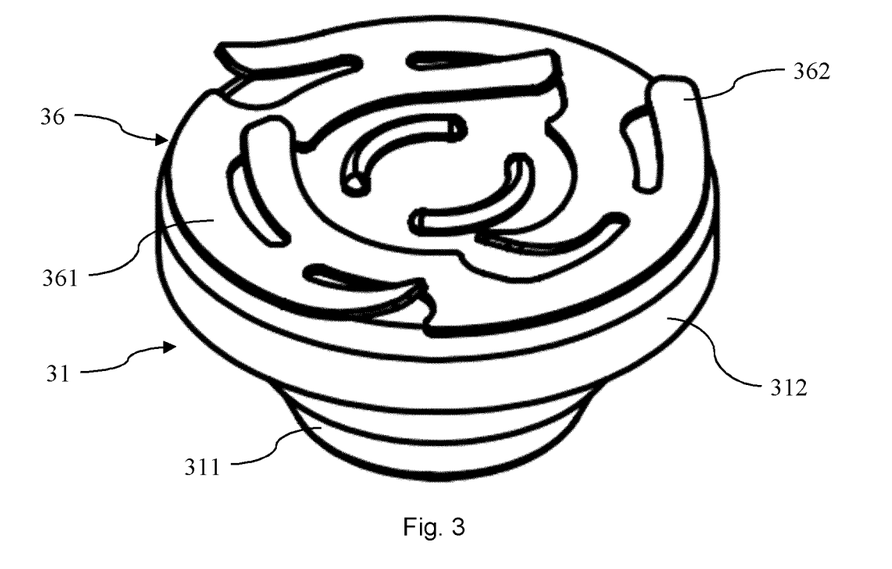
FIG. 3 shows a perspective view of a stopper member and a spring member of the kit of FIG. 1.
Figure 4:
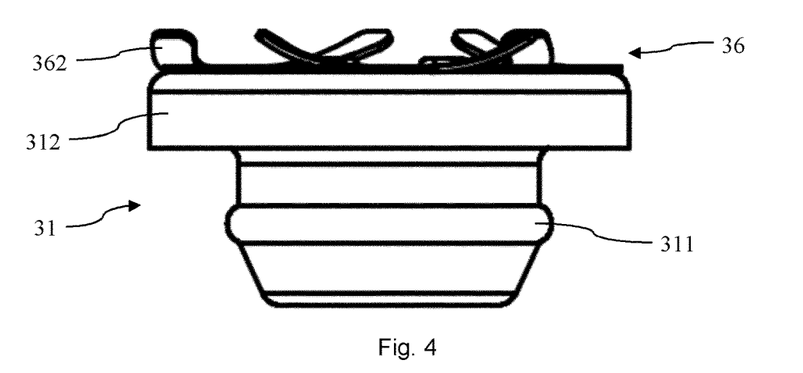
FIG. 4 shows a side view of the stopper member and the spring member of FIG. 3.

In FIG. 3 and FIG. 4 a stopper 31 as stopper member and a spring plate 36 as spring member of the closure system 3 of the kit 10 is shown. The stopper 31 has an essentially disk-shaped cover portion 312 and a plug portion 311. The cover portion 312 has a flat top surface onto which the spring plate 36 is positioned. In the assembled state, the plug portion 311 is tightly fitted into the opening 25 of the vial 2 provided through the head 21 of the vial 2. More specifically, the plug portion 311 is dimensioned such that it is radially compressed when being pushed into the opening 25 thereby tightening the opening of the vial 2. At the same time, the cover portion 312 abuts the boundary surface 24 of the vial 2. For ensuring a tight connection between the plug portion 311 and the opening 25, the plug portion 311 is provided with a circumferential bulge at its outer boundary.

The spring plate 36 has an essentially disk-shaped abutting section 361 and six elastic lamellas 362. The abutting section 361 is positioned on the flat surface of the cover portion 312 of the stopper 31 such that it abuts the cover portion 312 of the stopper 31. The lamellas 362 extend from the abutting section 361 more or less diagonally away from the cover portion 312.

Figure 5:
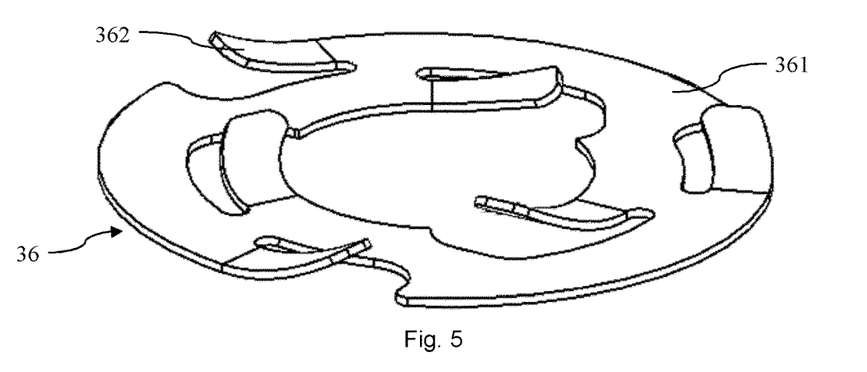
FIG. 5 shows a perspective view of the spring member of FIG. 3.

As can be seen in FIG. 5, the lamellas 362 are formed by cutting out sections of the disk of the abutting section 361 and bending the thereby formed lamellas 362. In particular, the lamellas 362 comprise three outer lamellas 362 extending in a counter-clockwise radial direction and three inner lamellas 362 extending in a clockwise radial direction. Centrally, the abutting section 361 is provided with circular opening allowing to access the stopper 31 when the spring plate 36 is positioned on the cover portion 312 of the stopper 31.

Figure 6:
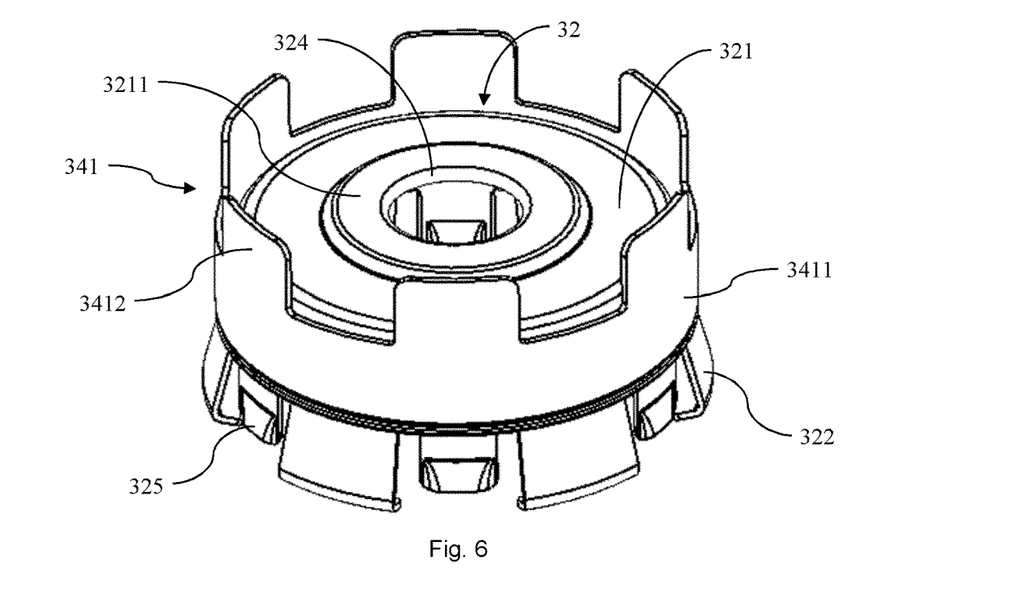
FIG. 6 shows a perspective view of a surrounding member arranged around a cage member of the kit of FIG. 1.

The closure system 3 of the kit 1 further comprises a lock activation formation. FIG. 6 shows a surrounding member 341 of the lock activation formation arranged on the cage 32.

The cage 32 of the closure system 3 is made of a rigid but to a certain extent elastic metallic material such as stainless steel. It has a more or less disk-shaped lid section 321 with a central aperture 324 and a plurality of positive form lock elements as a locking structure, each having a downwardly extending tongue 322. Further, the cage 32 has a detent structure with a plurality of downwardly extending clamping elements 325 configured to clamp the head 21 of the vial 2 in the assembled state of the closure system 3. More specifically, from the lid section 321, an essentially cylindrical intermediate section 323 (not visible in FIG. 6) downwardly extends which in turn passes over into downwardly extending tongues 322 and the downwardly extending clamping elements 325. The tongues 322 and the clamping elements 325 are regularly and alternately distributed about the intermediate section 323.

The surrounding member 341 is essentially crown-shaped. In particular, it consists of a ring 3411 from which six blades 3412 upwardly extend. The blades 3412 correspond to the through holes 331 of the cover 33. The surrounding member 341 is made as one piece of stainless steel. The blades 3412 of the surrounding member 341 are aligned with the clamping elements 325 of the cage 32. Accordingly, the tongues 322 are arranged at the sections of the ring 3411 not being provided with the tongues 322.

Figure 7:
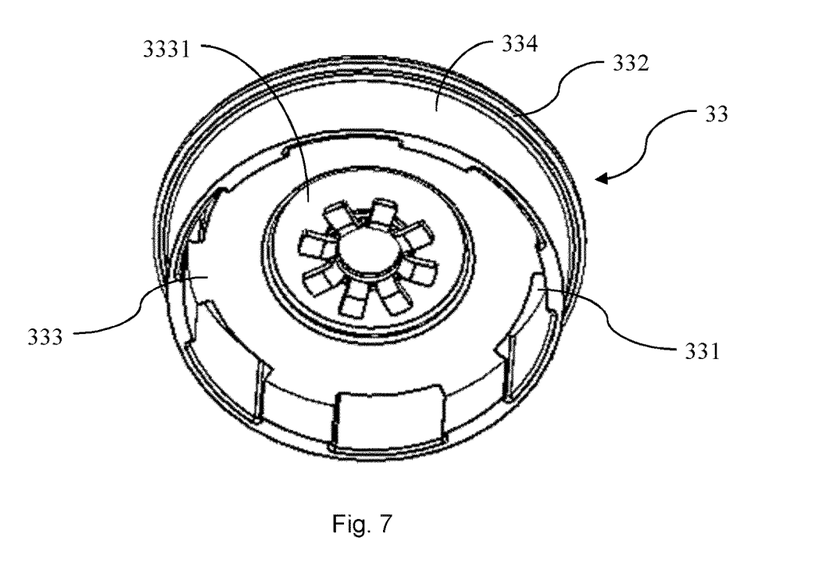
FIG. 7 shows a perspective view of a cover member of the kit of FIG. 1.

As can be best seen in FIG. 1 and, particularly, FIG. 7, the cover 33 has a ring portion 334 dimensioned to partially surround the cage 32 when being mounted to the vial 2, and a circular disk portion 333 dimensioned to close a top side of the cage 32. The disk portion 333 radially projects over the ring portion 334 such that a flange portion 332 is established. Adjacent to the flange portion 332 six slit-like through holes 331 are regularly arranged around the cover 33. Further, the disk portion 333 is provided with a central indentation 3331 to receive a portion of the cage 32 as described in more detail below.

Figure 8:
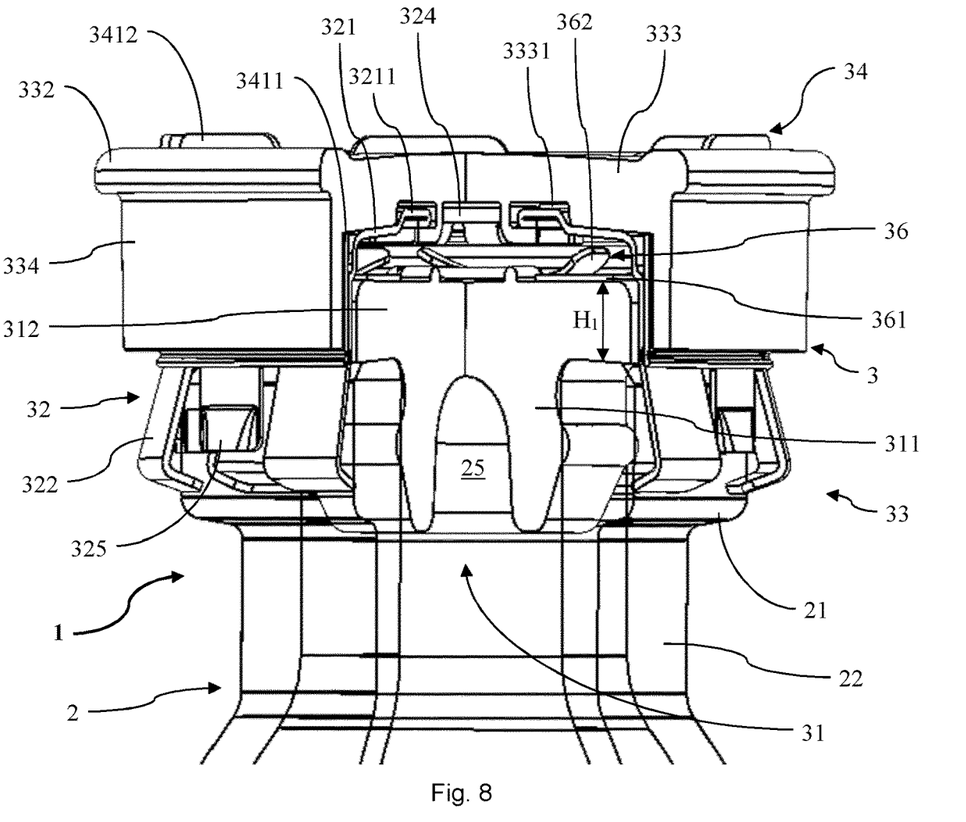
FIG. 8 shows a partially cut side view of a portion of the kit of FIG. 1 in the assembled state, wherein the cage member is in the detached position.

FIG. 8 shows the closure system 3 near the head 21 of the vial 2 in the assembled state, wherein the closure system 32 is in the detached position. There, the clamping elements 325 clamp the head 21 of the vial 2 such that the closure system 32 is held on the vial 2. The plug portion 31 of the stopper 31 is fitted into the opening 25 of the vial 2. It is equipped with a dome-shaped downwardly open cavity. The cover portion 312 of the stopper 31 abuts the boundary surface 24 of the vial 2. In the detached position, the spring member 36 located on the top surface of the cover portion 312 does not contact the cage 32 or its lid section 321, respectively. Thus, the cover portion 312 of the stopper 31 is not pushed by the cage 32 such that it is not compressed between the lid section 321 and the boundary surface 24. In this situation, the cover portion has a first height $H_1$.

The surrounding member 341 of the lock activation formation 341 is positioned around the intermediate section 323 of the cage 32. More specifically, the ring 3411 of the surrounding member 341 is dimensioned to fit to the cage 32 such that it is held by friction on the cage 32. The cage 32 is in the detached position in which it is not fixed but releasably held to the vial 2. In this detached position, the tongues 322 of the locking structure downwardly protrude the surrounding member 341 and do not engage or do disengage the vial 2. Further, the tongues 322 are essentially L-shaped having a straight leg section and a straight foot section. The leg section downwardly extends from the intermediate section 323 of the cage 32. Thereby, the leg sections of the tongues are not parallel to an axis of the vial 2 but aligned at an acute angle relative to the axis. Each leg section of the tongues 322 passes over into the foot section at its bottom end, wherein the foot sections and the leg sections are more or less at a right angle relative to each other.

The ring portion 334 of the cover 33 is arranged around the surrounding member 341 of the lock activation formation 34, wherein it is dimensioned to be held by friction. At a lower face of the disk portion 333 the indentation 3331 receives a corresponding circular bulge 3211 of the lid section 321 of the cage 32 surrounding the circular aperture 324.

Figure 9:
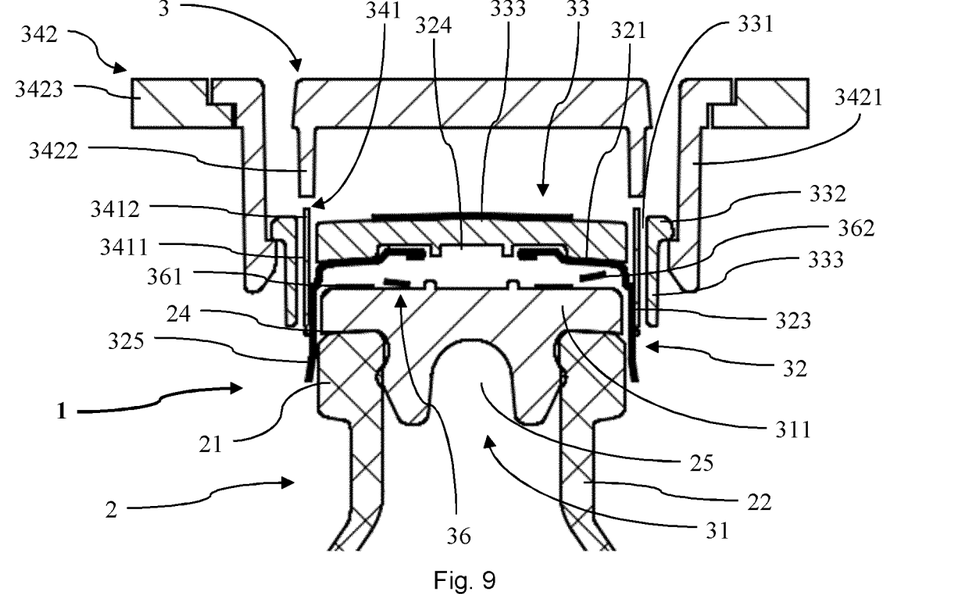
FIG. 9 shows a cross-sectional view of the portion of the kit of FIG. 8.

FIG. 9 shows that the lock activation formation further comprises an activator 342, here in a non-activating position. The activator 342 has a plate-like base equipped with downwardly extending clipping arms 3421 and downwardly extending blades 3422 adjacent to and corresponding to the six through holes 331 of the cover 33. In the assembled state, the clipping arms 3421 are clipped or snap-fitted behind the flange portion 332 of the cover 33 such that the activator 342 is secured to the cover 33. By having the blades 3422, the activator 342 is shaped to access the surrounding member 341 of the locking structure through cover 33. The blades 3412 of the surrounding member 341 extend bottom up through the through holes 331 of the cover 33. The blades 3422 of the activator 342 are positioned adjacent to and on top of the blades 3412 of the surrounding member 341. Further the activator 342 is equipped with four downwardly extending inclined or diagonal lamellas (not visible in the Figs.) as spring or support members. The lamellas are positioned between the activator 342 and the cover 33 such that the activator 342 is pushed away from the cover 33 and the cage 32.

Figure 10:
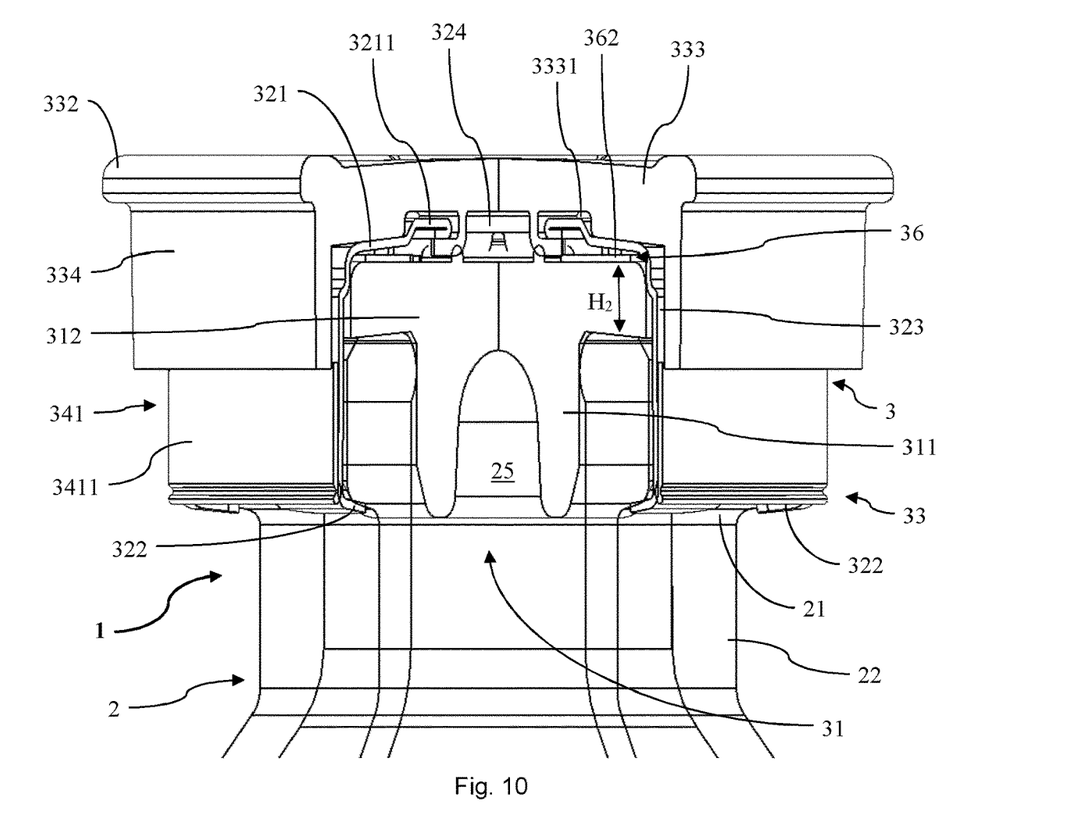
FIG. 10 shows a partially cut side view of a portion of the kit of FIG. 1 in the assembled state, wherein the cage member is in a fixed position.

In FIG. 10 the closure system 3 is shown near the head 21 of the vial 2 in its assembled state, wherein the cage 32 is in a fixed position. The cover 33 is pressed on the cage 32 which in turn pushes the spring member 36 located on the top surface of the cover portion 312 of the stopper 31. Thereby, the elastic lamellas 362 are continuously bent towards the cover portion 312 of the stopper 31, i.e. the lamellas are collapsing, wherein the linear spring characteristics of the spring member 36 assure that the spring force applied by the abutting section 361 of the spring member 36 to the cover portion 311 of the stopper 31 is constant and independent from a level of collapse of the lamellas 362. Like this, it is achieved that independent of the exact level of pushing the cage 32 relative to the stopper 31, a predefined compression force, which corresponds to the spring force of the spring member 36 and which may be about 15 N, is applied to the cover portion 312 of the stopper 31. Thus, the cover portion 312 is compressed to a predefined extent between the lid section 321 of the cage 32 and the boundary surface 24 of the vial 2. When being compressed like this, the cover portion 312 of the stopper 31 has a second height $H_2$, which is smaller than the first height $H_1$. Like this, the spring member 36 compensates manufacturing tolerances potentially involved in any of the components of the kit 1 such that an appropriate tightness between the vial 2 and the stopper 31 can be established and it can be assured that the stopper 31 is not damaged due to excessive compression.

The tongues 322 of the locking structure of the cage 32 are downwardly moved relative to the vial 2 and the surrounding member 341 of the lock activation formation 34 is downwardly moved relative to the cage 32. Thereby, the surrounding member 341 interacts with the tongues 322, i.e. contacts the tongues 322 and inwardly bends them towards the axis of the vial 2 being aligned with an axis of the closure system 3. More specifically, the tongues 322 are deformed such that their leg sections are essentially parallel to the axis of the vial 2 and their foot sections grip or engage the lower end of the head 21 of the vial 2 as corresponding structure of the vial 2. The surrounding member 341 holds and secures the tongues 322 in this position. Thereby, a form-fitted connection between the cage 32 and the vial 2 is generated such that the cage 32 is locked on the vial 2 and the stopper 31 is secured in the compressed state.

Figure 11:
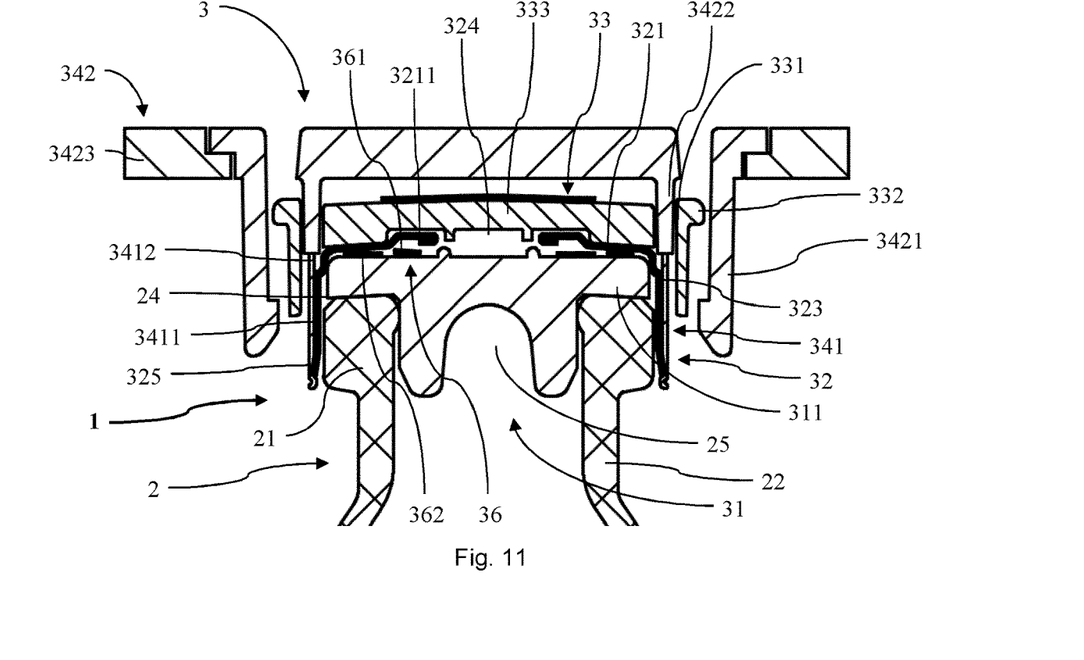
FIG. 11 shows a cross-sectional view of the portion of the kit of FIG. 10.

FIG. 11 shows that, for locking the closure system 3 to the vial 2, the activator 342 of the lock activation formation 34 is downwardly pushed from the non-activating position into an activating position. Thereby, the lid section 321 of the cage 32 is moved towards the cover portion 312 of the stopper 31 as described above. The activator 342 is downwardly moved relative to the cage 32 and vial 2. Thereby, the blades 3421 of the activator 342 are moved top down into the through holes 331 of the cover 33. The blades 3412 of the surrounding member 341 are contacted such that the surrounding member 341 is downwardly moved relative to the cage 33 which in turn inwardly moves the tongues 322 to lock the cage 32 on the vial 2 as described above. Like this, the lock activation formation 34 interacts with the cage 32 to change the cage 32 from the detached position to the fixed position.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A closure system for closing an opening of a container, comprising:
    a stopper member made of an elastic material and having a plug portion configured to fit into the opening of the container and a cover portion configured to abut a boundary surface adjacent to the opening of the container;
    a spring member; and
    a cage member configured to be mounted to the container, wherein the closure system is configured to be in an assembled state in which the plug portion of the stopper member is fitted into the opening of the container, the cover portion of the stopper member abuts the boundary surface of the container, the cage member is mounted to the container to hold the stopper member and the stopper member is compressed between the cage member and the boundary surface of the container, and
    wherein the cage member and the spring member are configured to position the spring member between the cover portion of the stopper member and the cage member such that the spring member is arranged to push the cage member away from the cover portion of the stopper member, when the closure system is in the assembled state.

2. The closure system of claim 1, wherein the cage member has a locking structure configured to engage a corresponding structure of the container, a lid section and an intermediate section between the lid section and the locking structure.

3. The closure system of claim 2, wherein the locking structure of the cage member comprises at least one positive form lock element configured to be deformed to engage the corresponding structure of the container.

4. The closure system of claim 3, wherein the at least one positive form lock element of the locking structure of the cage member comprises a tongue portion.

5. The closure system of claim 4, wherein the tongue portion of the at least one positive form lock element of the locking structure of the cage member extends from the intermediate section of the cage member.

6. The closure system of claim 4, wherein the tongue portion of the at least one positive form lock element of the locking structure of the cage member is elastically movable relative to the intermediate section of the cage member.

7. The closure system of claim 1, wherein the cage member is made of a shape-retentive material.

8. The closure system of claim 7, wherein the shape-retentive material is a metal.

9. The closure system of claim 1, wherein the spring member has essentially linear spring characteristics.

10. The closure system of claim 2, wherein the intermediate section of the cage member is configured to surround the spring member and at least a portion of a head portion of the container, when the closure system is in the assembled state.

11. The closure system of claim 2, wherein the intermediate section of the cage member is essentially cylindrical.

12. The closure system of claim 2, wherein the lid section of the cage member comprises an aperture such that the cover portion of the stopper member is accessible through the aperture of the lid section when the closure system is in the assembled state.

13. The closure system of claim 12, comprising a cover member reversibly mountable to the lid section of the cage member to close the aperture of the lid section of the cage member.

14. The closure system of claim 1, wherein the cover portion of the stopper member has an edge section with a front face configured to abut the boundary surface of the opening of the container and a back face opposite to and corresponding to the front face of the edge section, wherein the spring member is configured to abut the back face of the edge section of the stopper member when the closure system is in the assembled state.

15. The closure system of claim 1, wherein the spring member has an abutting section and at least one elastic lamella, wherein the abutting section is configured, in the assembled state, to abut the cover portion of the stopper member and the at least one lamella to extend from the abutting section towards the cage member.

16. A kit comprising:
a container; and
a closure system according to claim 1,
wherein the container comprises an opening for accessing an interior of the container and a boundary surface adjacent to the opening.

17. The closure system of claim 8, wherein the metal is a steel or a stainless steel.

\* \* \* \* \*